350-377
SR ~~928 N~~ WR
SEARCH ROOM
XR 3,224,333 [redacted]
T365/122
T2674

Dec. 21, 1965 A. J. KOLK, JR., ET AL 3,224,333

MAGNETO-OPTIC DEVICE EMPLOYING REFLECTIVE LAYER TO PROVIDE INCREASED KERR ROTATION

Filed May 19, 1961 3 Sheets-Sheet 1

INVENTORS:
Anthony J. Kolk, Jr.
Milivoj Orlovic
Louis A. Kline
By John J. Mattaga
Meyer L. Young
Their Attorneys INVENTORS:
Anthony J. Kolk, Jr.
Milivoj Orlovic
By Louis A. Kline
John T. Matlago
Morgan L. Young
Their Attorneys Dec. 21, 1965 A. J. KOLK, JR., ET AL 3,224,333

MAGNETO-OPTIC DEVICE EMPLOYING REFLECTIVE LAYER TO PROVIDE INCREASED KERR ROTATION

Filed May 19, 1961 3 Sheets-Sheet 3

INVENTORS:
Anthony J. Kolk, Jr.
Milivoj Orlovic
By Louis A. Kline
John J. Matlago
Murray L. Lane
Their Attorneys 3,224,333

MAGNETO-OPTIC DEVICE EMPLOYING REFLECTIVE LAYER TO PROVIDE INCREASED KERR ROTATION

Anthony J. Kolk, Jr., Rolling Hills, and Milivoj Orlovic, Gardena, Calif., assignors to The National Cash Register Company, Dayton, Ohio, a corporation of Maryland Filed May 19, 1961, Ser. No. 111,231
9 Claims. (Cl. 88—61)

This invention relates to an improved magnetic device for modulation of electro-magnetic waves and more particularly to thin magnetic films having optimum characteristics for magneto-optic application.

In the field of magnetic recording and information storage, conventional systems employ magnetic recording and play-back heads which must be placed in close proximity with the recording medium. Such small tolerances require precision machining and even then, contact between the head and the recording medium causes excessive wear. In the commonly assigned copending application of Miyata, Serial No. 842,407 filed September 25, 1959, there is disclosed a system which utilizes, in place of a magnetic play-back head, the effect of the surface magnetization upon a plane polarized light beam which effect may be regarded as a rotation of the plane of polarization. In general, such a magneto-optic system employs a polarizer in the path of a beam, incident upon a magnetic surface with the polarizer axis being set either parallel or perpendicular to the plane of incidence and an analyzer is placed in the reflected beam with the axis of the analyzer being set within a few degrees of the extinction position for one of the magnetized states of the magnetic surface. The light of the reflected beam transmitted through the analyzer is then detected by an appropriate photo-detector system the output of which will be dependent upon the surface characteristics that determine the magnitude of the magneto-optic rotation. The system, however, will inherently contain noise sources which depend upon characteristics of the photo-detector circuit and also upon the characteristics of the magnetic surface. Therefore, in the design of a magneto-optic system consideration must be given to the surface characteristics such as those which affect the magneto-optic rotation of the plane polarized light and the reflectance of the magnetic surface.

It is the major object of this invention to provide an improved magnetic device having optimum magneto-optic characteristics.

It is another object of this invention to provide an improved magnetic device which in a given magneto-optic system will provide that system with an optimum signal to noise ratio.

It is still another object of this invention to provide an improved magnetic device for a magneto-optic system which is capable of providing an increased magneto-optic rotation of plane polarized light.

When a plane polarized beam of light is reflected off of a magnetic surface, the magneto-optic rotation resulting therefrom is referred to as the Kerr effect and in the present invention this effect is enhanced by a reflection and interference phenomenon within a thin film of a ferro-magnetic material. A major feature of the present invention, then, lies in the structure of a magnetic device which includes a layer of magnetic material disposed over reflective silver substrate where the thickness of the magnetic layer is so chosen that the layer is not opaque to incident light a portion of which will pass through the layer for reflection off of the silver substrate to combine with the initially reflected light.

Other objects, advantages, and features will become more readily apparent when viewed in light of the following disclosure and appended claims taken in conjunction with the drawings wherein;

Figure 1:
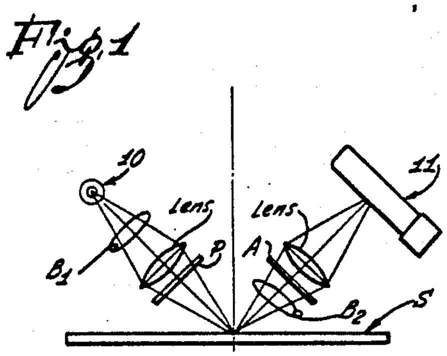
FIG. 1 is a schematic representation of a magneto-optic system such as employs the magnetic structure of the present invention.

Referring to FIG. 1 there is shown an exemplary magneto-optic system including light source 10 for producing an incident beam of light $B_1$ which is directed through polarizer P onto the surface of a magnetic structure S for reflection of the light in the form of beam $B_2$ through analyzer A to a photo-detector system 11. Light source 10 may be adapted to provide a light of a particular frequency or it may be adapted to provide white light having a spectral distribution that peaks at some particular frequency within the spectral distribution. The orientation of the light source 10 and the photo-detector system 11 is such that the optical system is symmetrical in the plane of incidence and the axis of polarizer P is arranged such that the plane of polarization of the polarized beam $B_1$ is either parallel to or perpendicular to the plane of incidence with the axis of the analyzer A being positioned within a few degrees of the extinction position.

Figure 2:
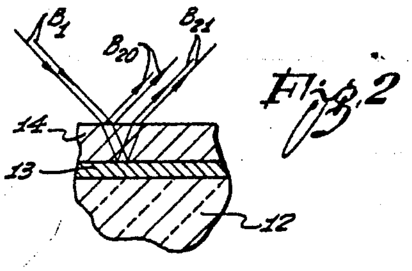
FIG. 2 is a cross sectional view of the magnetic structure.

Referring to FIG. 2 there is shown an enlarged cross sectional view of magnetic structure S which includes base member 12 upon which is deposited reflective substrate 13 that is preferably silver. Substrate 13 is sufficiently thick as to be opaque to transmitted light. Magnetic layer 14 is a thin film of a magnetic material, desposited upon silver substrate 13 by evaporation techniques and is of such a nature that the magnetic domains therein may be oriented in a transverse or longitudinal direction by a standard magnetic recording head.

As illustrated in FIG. 2, an incident beam of light B, will result in reflected components $B_{20}$ and refracted components which are absorbed within layer 14 of magnetic material when this layer has sufficient thickness. In the present invention, reflective layer 13 is inserted below the surface of layer 14 to reflect the refracted components before they are absorbed by layer 14. These second reflected components $B_{21}$ will have have a a phase difference relative to components $B_{20}$ which difference is dependent on the depth of layer 13 below the outer surface of magnetic layer 14. Variation of the thickness of layer 14 will then result in variation of the magnet-optic component imparted to the reflected light by the magnetic material and also cause an interference between components $B_{20}$ and $B_{21}$ (and any subsequently reflected rays not absorbed by layer 14).

While reference has been made herein to a magneto-optic system employed as a play-back head for reading information stored in the recording medium, the present invention may be employed in any magneto-optic system where the magnetic surface is utilized to modulate an incident beam of electro-magnetic waves. For example, in the situation of Laser modulation, a wave guide may be employed consisting of glass walls the inside surfaces of which bear a thin magnetic layer and the reflective substrate is disposed over the layer. Thus, the present invention is not to be limited to the structure of FIG. 2 where the silver substrate lies between base 12 and magnetic layer 14 but rather the present invention lies in a magnetic layer to receive incident light on one surface with the opposite surface bearing a reflective substrate to reflect the light as shown schematically in FIG. 2.

The signal to noise ratio for the output signal of the magneto-optic system shown in FIG. 1 will be dependent upon both parameters of the photo-detector system 11 as well as the degree of magneto-optical rotation and the reflectance of the surface of magnetic structure S. The characteristics of the magnetic surface which affect the signal-to-noise ratio are defined by the "figure of merit," the value of which is generally proportional to the magneto-optic rotation and to the surface reflectance.

Since the figure of merit for the film increases as the reflectance of the film is decreased and also as the magneto-optic rotation is increased, the thickness of magnetic layer 14 is so chosen as to obtain appropriate values for each entity resulting in an optimum figure of merit. In order to obtain optimum magneto-optic rotation, the thickness of layer 14 is so chosen to be small enough so as to be non opaque to the incident light, a situation which exists when the thickness of the layer is approximately equal to or less than the quarter wave length of the incident light as corrected for the index of refraction of the material (cf. Born and Wolf, Principles of Optics, Permagon Press, Pages 627–628). Above this thickness, the magnetic layer will absorb sufficient light as to be opaque for practical purposes. On the other hand, the magneto-optic contribution to the traversing beam should increase as the path length of the light beam through the material is increased and therefore the material should be chosen to be as thick as possible before a large degree of absorption of the light is encountered. More importantly, the magneto-optic rotation is increased, not only by an increase of the magneto-optic component, but also by a decrease of the surface reflectance obtained through choice of that thickness of magnetic layer which allows interference between the respective reflected rays.

Figure 3:
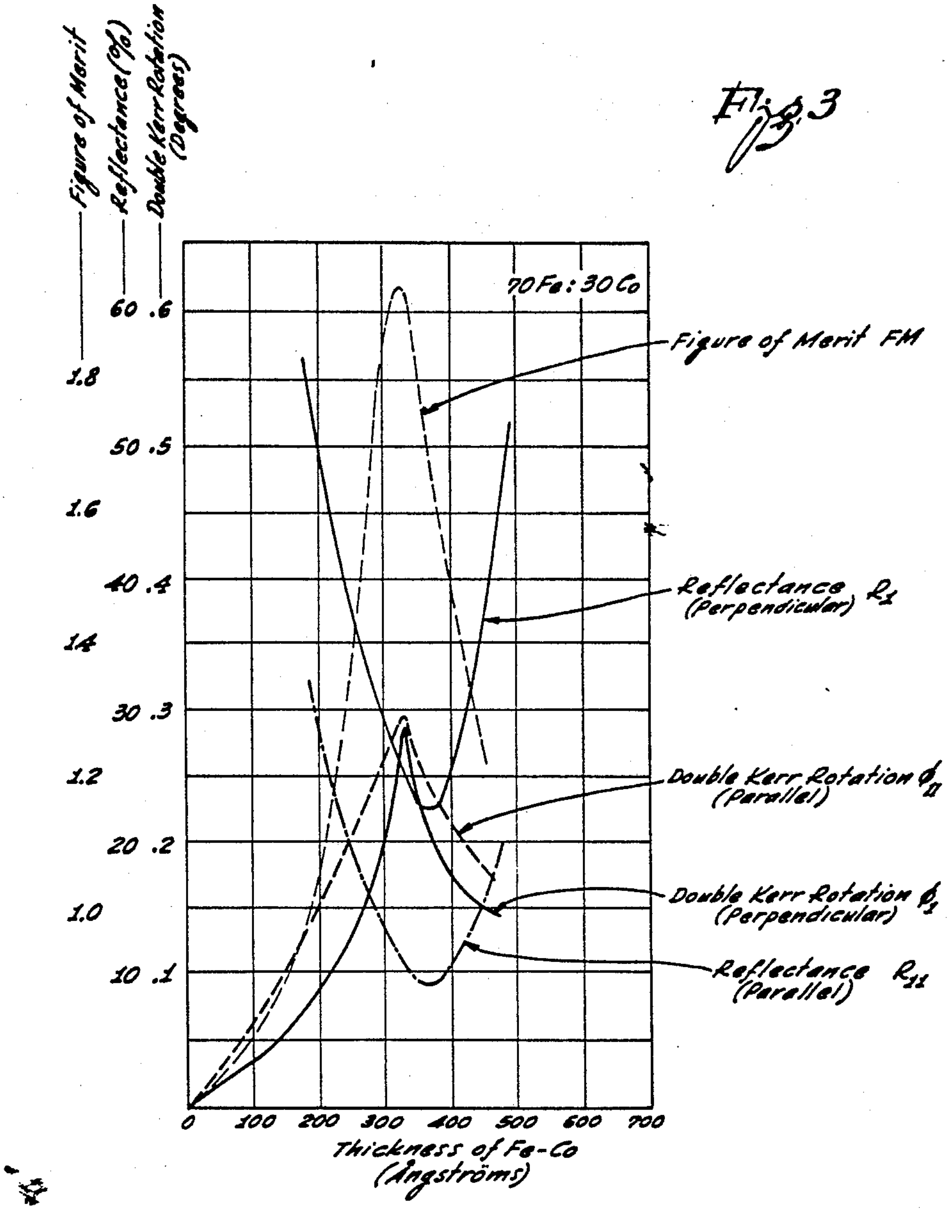
FIG. 3 is a graphical representation of the magneto-optical properties of the structure of the present invention employing a magnetic layer of iron-cobalt.

Referring now to FIG. 3 there are shown graphical plots of the magneto-optic rotation, the reflectance and the figure of merit for an iron-cobalt film as a function of the thickness thereof. The film is composed of 70% iron and 30% cobalt and has been magnetized to its saturation point and allowed to return to a remanent state. The actual functions measured and plotted include the magneto-optic rotations $\phi_1$ and $\phi_{11}$, and the reflectances $R_1$ and $R_{11}$ for light beams having the respective planes of polarization perpendicular and parallel to the plane of incidence. ($\phi_1$ and $\phi_{11}$ represent double Kerr rotations, that is, the difference between respective Kerr rotations for the two remanent magnetic states). The resultant figure of merit FM is given by the expression:

$$FM=\frac{\phi_1 R_1+\phi_{11} R_{11}}{\sqrt{R_1+R_{11}}}$$

For the curves shown in FIG. 3 the incident light was of a wave length of approximately 5,000 angstroms. It will be noted that as the thickness is increased the respective reflectances decrease until the thickness of approximately 350 angstroms is obtained after which the reflectances then increase. On the other hand it will be noted that both the parallel and perpendicular magneto-optic rotations increase up to a thickness of approximately 350 angstroms after which the respective rotations decrease and the resultant figure of merit follows the same general pattern. The value of the figure of merit obtained for optimum thickness of the magnetic layer is greater than the bulk value obtained for layers thicker than 600 angstroms which are opaque to the incident light.

Figures 4, 5:
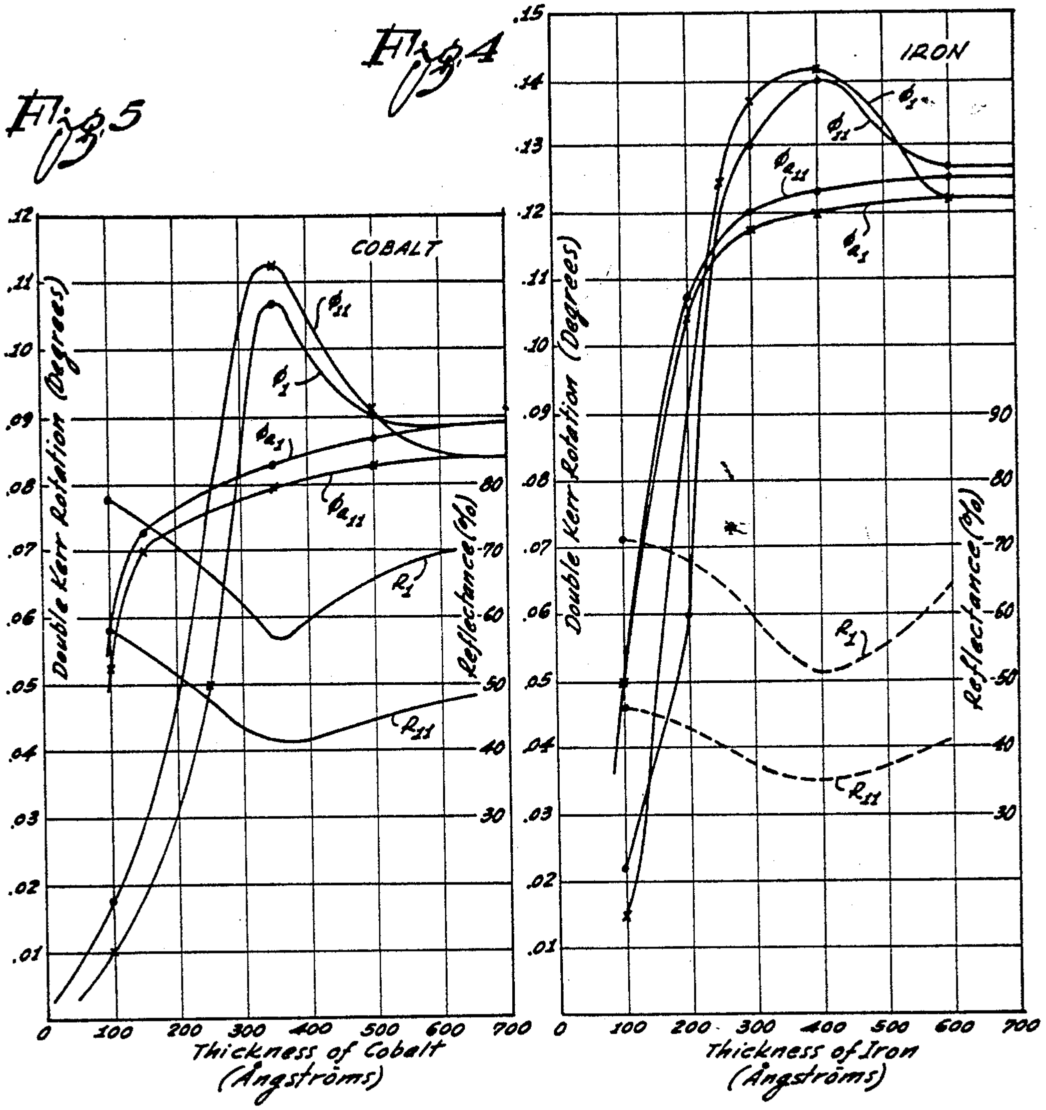
FIG. 4 is a graphical representation similar to FIG. 3 for a structure employing a magnetic layer of iron.
FIG. 5 is a graphical representation similar to FIG. 3 for a structure employing a magnetic layer of cobalt.

Referring now to FIG. 4, there are shown curves for the magneto-optic rotation and reflectances as a function of the thickness of a thin film of elemental iron. These curves are similar to those in FIG. 3 except that the resultant figure of merit has not been shown. Also shown in FIG. 4 are the magneto-optic rotation $\phi a_1$ and $\phi a_{11}$ for light beams having respective planes of polarization perpendicular and parallel to the plane of incidence for an iron film which has not been provided with a silver substrate. It will be noted that the latter curves do not exhibit the peak values which are obtained when the magnetic layer is provided with the silver substrate and that as the thickness is increased above 600 angstroms these values approach the same bulk values for the material as do the curves for the thin film having a silver substrate.

Figure 6:
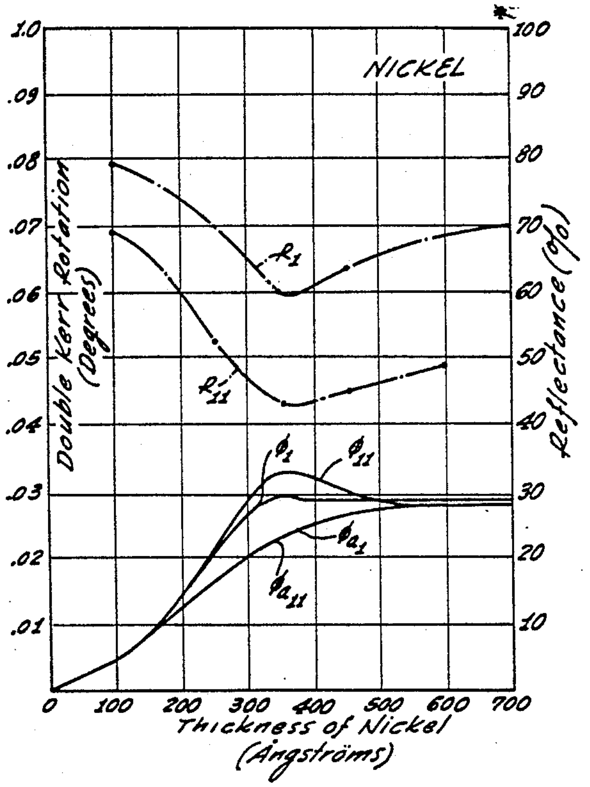
FIG. 6 is a graphical representation similar to FIG. 3 for a structure employing a magnetic layer of nickel.

FIGS. 5 and 6 are similar to FIG. 4 except that they are for thin layers of elemental cobalt and nickel respectively. Also included are plots of the magneto-optic rotations $\phi a_1$ and $\phi a_{11}$ for the thin magnetic layers without the silver substrate and it is seen again that these latter curves do not exhibit the peak values obtained when the magnetic layer is provided with the silver substrate.

In the case of each material, the silver substrate has been deposited upon the base member by evaporation techniques in an evacuated chamber and the magnetic layer has then been deposited upon the silver substrate without exposing the silver substrate to air. It has been observed, when the silver substrate has first been exposed to air before depositing of the magnetic layer, that the peak effects as shown in FIGS. 3 to 6 are diminished. Thus, it is apparent that optimum values of magneto-optic rotation and the resultant figure of merit are achieved when the thin magnetic film and the silver substrate are in sufficient contact with one another as to preclude the possibility of an intermediate layer therebetween.

While it is well known that the Kerr rotation can be increased by over-coating the magnetic layer with such materials as silicon oxide or zinc sulfide, the use of such over-coats decreases the reflectance with a resultant reduction of the optimum value of the figure of merit. However, the magneto-optic characteristics of such over-coating layers can be further enhanced by use of the reflective substrate as disclosed in the present invention.

When a plane polarized beam of light is reflected off of the magnetic surface, the effect thereof is to produce an electric vector normal to the plane of polarization which is referred to as the Kerr component. The angle of the Kerr rotation then can be viewed as the arc tangent of the ratio of the Kerr component to the normally reflected component lying in the plane of polarization. And when an over-coating layer is employed such as described above, the increase in the Kerr rotation can be attributed to an increase in the magntiude of the Kerr component by multiple reflection within the over-coating layer wherein each such reflection contributes to the Kerr component. On the other hand, the magnitude of the normally reflected vector lying in the plane of polarization is diminished by succeeding reflected rays which differ in phase. However, as pointed out earlier, the contribution to the signal to noise ratio of the magneto-optic system is not only proportional to the magneto-optic rotation but also to some power of the reflectance which is decreased by the over-coating layer. Thus, as distinct from an over-coated device the present invention achieves an optimum figure of merit in dependence upon the choice of a structure which achieves an optimum relationship between magneto-optic rotation and the reflectivity. This optimum figure of merit when described as a function of the thickness of the magnetic medium is achieved when that thickness of the magnetic medium is sufficiently small to render the medium non-opaque and where the opposite side of the medium is provided with reflective surface to enhance both the normally reflected component and the Kerr component of the plane polarized light beam.

With the present disclosure in view, modifications of the invention will appear to those skilled in the art; and accordingly it is not desired to be limited to the exact detail of the illustrated preferred embodiments.

What is claimed is:

1. In a magneto-optic system, a magnetic device comprising a layer of magnetic material having a first surface for receiving an incident beam of light and a second surface opposite to said first surface, and an opaque layer of reflective material in uniform contact with said second surface, said layer of magnetic material having a thickness of less than 600 angstroms.

2. In a magneto-optic system, a magnetic device comprising a base member, a first opaque layer of reflective material uniformly deposited on said base member and a second layer of magnetic material uniformly deposited on said first layer, said second layer having an exposed surface for receiving an incident beam of light and having a thickness of less than 600 angstroms.

3. A magnetic device according to claim 2 wherein the reflective material is silver.

4. A magnetic device according to claim 2 wherein the magnetic material is composed of 70% iron and 30% cobalt.

5. A magnetic device according to claim 2 wherein the magnetic material is composed of elemental iron.

6. A magnetic device according to claim 2 wherein the magnetic material is composed of elemental cobalt.

7. A magnetic device according to claim 2 wherein the magnetic material is composed of elemental nickel.

8. In a magneto-optic system, a thin layer of magnetic material having a first surface for receiving an incident beam of electromagnetic waves and a second surface opposite said first surface, and a layer of reflective material in uniform contact with said second surface, said layer of magnetic material being sufficiently thin so that said incident beam passes therethrough to said layer of reflective material for reflection thereby, the thickness of said layer of magnetic material being chosen to provide minimum reflectance of said incident beam, whereby the magneto-optic rotation of the reflected beam is maximized.

9. The invention in accordance with claim 8, wherein said layer of magnetic material has a thickness less than 600 angstroms.

References Cited by the Examiner

UNITED STATES PATENTS

| | | | |
|---|---|---|---|
| 2,884,337 | 4/1959 | Homer et al. | 88—105 |
| 2,984,825 | 5/1961 | Fuller et al. | 88—61 X |

OTHER REFERENCES

Archibald et al.: "High Speed Magneto-optical Measurements on Film," The Review of Scientific Instruments, vol. 31, No. 6, June 1960, pages 653–655, page 653 shows optical set up.

Olson et al.: "Flux Reversal in Thin Flms of 82% Ni, 18% Fe," Journal of Applied Physics, vol. 29, No. 3, March 1958, page 274.

JEWELL H. PEDERSEN, *Primary Examiner.*

EMIL G. ANDERSON, *Examiner.*